(12) United States Patent
    Kawamoto

(10) Patent No.: US 8,755,083 B2
(45) Date of Patent: Jun. 17, 2014

(54) IMAGE CHECKING DEVICE, PRINTING SYSTEM, IMAGE CHECKING METHOD, AND COMPUTER PROGRAM PRODUCT

(75) Inventor: Hiroyuki Kawamoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 371 days.

(21) Appl. No.: 13/314,313

(22) Filed: Dec. 8, 2011

(65) Prior Publication Data

US 2012/0147397 A1 Jun. 14, 2012

(30) Foreign Application Priority Data

Dec. 10, 2010 (JP) .................................. 2010-275529
Nov. 28, 2011 (JP) .................................. 2011-258777

(51) Int. Cl.
    *H04N 1/60* (2006.01)
    *G06K 1/00* (2006.01)

(52) U.S. Cl.
    USPC ........... 358/1.9; 358/1.13; 358/501; 358/505; 358/448; 382/190; 382/195; 399/49

(58) Field of Classification Search
    None
    See application file for complete search history.

(56) References Cited

U.S. PATENT DOCUMENTS 7,974,474 B2* 7/2011 Hirohata et al. ............... 382/209
8,488,188 B2* 7/2013 Nomura ......................... 358/1.9

FOREIGN PATENT DOCUMENTS

JP  4179471 A  9/2008
JP  4265176 A  2/2009
JP  4470500 B2  3/2010

* cited by examiner

*Primary Examiner* — Quang N Vo
(74) *Attorney, Agent, or Firm* — Harness, Dickey & Pierce, P.L.C.

(57) ABSTRACT

An image checking device checks a printed image printed out on a printing medium. The image checking device includes a data acquiring unit that acquires checking-image data, original reference image data input to an image forming device, and, from an attribute-information storage unit of the image forming device, attribute information about a printing medium; a correction-parameter storage unit that stores therein a correction parameter corresponding to the attribute information; an image generating unit that reads, from the correction-parameter storage unit, a correction parameter corresponding to the attribute information, corrects the original reference image data by using the correction parameter, and generates corrected reference image data; and an image checking unit that compares the checking-image data with the corrected reference image data by using a pre-set value to determine the degree of matching between the checking-image data and the corrected reference image data, thereby performing image checking on the printed image.

10 Claims, 9 Drawing Sheets

|  | C (CYAN) | M (MAGENTA) | Y (YELLOW) |
|---|---|---|---|
| PAPER TYPE A | 9 | 10 | 7 |
| PAPER TYPE B | 10 | 11 | 14 |
| PAPER TYPE C | 15 | 14 | 0 |

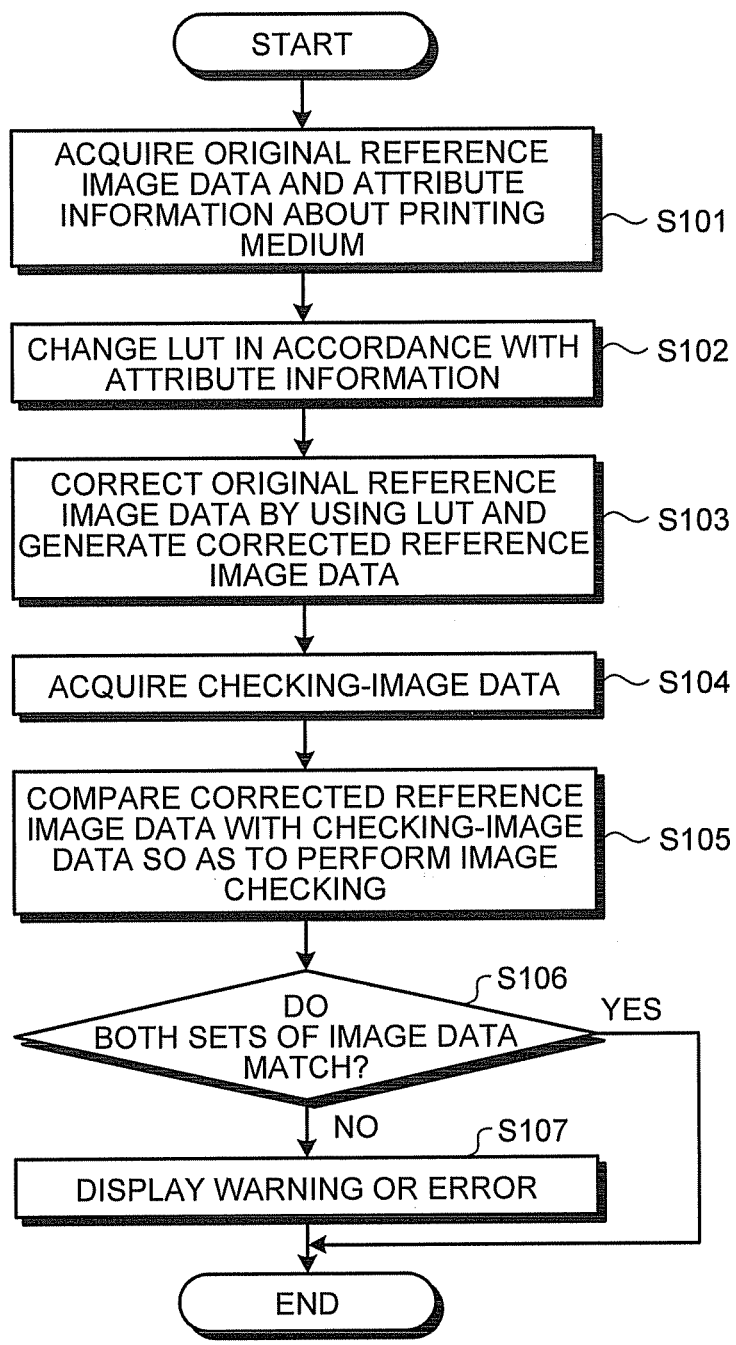

IMAGE CHECKING DEVICE, PRINTING SYSTEM, IMAGE CHECKING METHOD, AND COMPUTER PROGRAM PRODUCT

CROSS-REFERENCE TO RELATED APPLICATIONS

The present application claims priority to and incorporates by reference the entire contents of Japanese Patent Application No. 2010-275529 filed in Japan on Dec. 10, 2010 and Japanese Patent Application No. 2011-258777 filed in Japan on Nov. 28, 2011.

BACKGROUND OF THE INVENTION

1. Field of the Invention

The present invention relates to an image checking device that compares a read image with a reference image so as to perform image checking, to a printing system that includes the image checking device, to an image checking method, and to a computer program product.

2. Description of the Related Art

Document printing is performed by using, for example, a method for directly spraying ink onto a sheet of paper on the basis of an original document or a method for transferring ink onto a sheet of paper by using, as a medium, a plate that is created on the basis of an original document. Methods using a plate include relief printing, planographic printing, intaglio printing, and screen printing. Out of these methods, planographic printing predominates in commercial printing because it offers advantages in that it can represent images that are close to the original images and create high-quality printed material.

Planographic printing is offset printing in which ink is attached to a plate with images formed thereon and the plate with the ink image is brought into contact with a blanket for transferring so that the ink image is printed on a sheet of paper via the blanket. Offset printing is a printing technology in which an image is not directly printed from the plate onto the sheet of paper but is printed via a medium, such as a blanket. A device that uses this technology is an offset printer and is used in the printing industry, or the like, as a printer that can print any number of copies of the same material once the plate is made.

Some offset printers have an image checking device that compares an image of the printout read by an image reading device with a prepared reference image so as to perform image checking. Installing this image checking device makes it possible to determine whether a print is acceptable and to maintain a constant image quality of printed material.

However, the degree of ink blur is different depending on the type of paper of printed material. For example, copy paper with superior smoothness, such as commonly used high-quality paper, has a different degree of ink blur from Japanese paper that has a fibrous surface; therefore, there is a problem in that the quality of a printed image varies depending on the type of paper. Furthermore, the level of image quality may be different depending on the content of information (a thin line image, a solid image, or the like) to be printed.

In recent years, on-demand printing, where printing is performed immediately after a command is received, has been put into practical use. Image checking is also required for on-demand printing. With on-demand printing, the details of printing may change for each copy; therefore, it is impossible to prepare a reference image. Thus, it is necessary to create a reference image from the print data; however, because the print data does not include information about the type of paper, it is difficult to create a reference image with the accuracy that is required for image checking.

In view of the above problems, a device is disclosed which can set details for checking and acceptance criteria for printed material in accordance with the type of printing medium, such as the type of paper (for example, Japanese Patent Application Laid-open No. 2005-205703). Information about the trays, the type of printing medium contained in each tray, and checking information for checking an image formed on each printing medium are stored in this device in an associated manner, and the criteria, which are set for the printing medium with the image formed thereon, are used for checking the printed material by comparing an image read from the printed material with the reference image after the image has been formed, whereby it can be determined whether the printed material is acceptable on the basis of the checking criteria, which are set for each printing medium.

In the above-described device, because the checking criteria are changed in accordance with the type of paper, it is possible to provide printed material with a constant image quality regardless of the type of paper.

However, in the above-described conventional technology, the difference that occurs between the read image and the reference image is not only due to the type of paper but also the different degrees of change in the densities of highlights and shadows depending on the type of paper; thus, if the type of paper is changed, the above device cannot ensure a constant checking accuracy for all of the density ranges from highlights to shadows. Thus, there is a need to provide an image checking device that can correspond to such changes in the density.

SUMMARY OF THE INVENTION

It is an object of the present invention to at least partially solve the problems in the conventional technology.

An image checking device checks a printed image printed out on a printing medium by an image forming device and read by an image reading device. The image forming device includes an attribute-information storage unit that stores therein attribute information about the printing medium. The image checking device includes a data acquiring unit that acquires checking-image data that is read by and output from the image reading device, original reference image data that is input to the image forming device, and, from the attribute-information storage unit, attribute information about a printing medium on which an image is printed; a correction-parameter storage unit that stores therein a correction parameter corresponding to the attribute information; an image generating unit that reads, from the correction-parameter storage unit, a correction parameter corresponding to the attribute information acquired by the data acquiring unit, corrects the original reference image data by using the correction parameter, and generates corrected reference image data; and an image checking unit that compares the checking-image data with the corrected reference image data by using a pre-set value so as to determine the degree of matching between the checking-image data and the corrected reference image data, thereby performing image checking on the printed image.

An image checking method is for checking a printed image printed out on a printing medium by an image forming device and read by an image reading device. The image forming device includes an attribute-information storage unit that stores therein attribute information about the printing medium and including a correction-parameter storage unit that stores therein a correction parameter corresponding to the attribute information. The image checking method includes acquiring checking-image data that is read by and output from the image reading device, original reference image data that is input to the image forming device, and, from the attribute-information storage unit, attribute information about a printing medium on which an image is printed; reading, from the correction-parameter storage unit, a correction parameter corresponding to the attribute information acquired at the acquiring, correcting the original reference image data by using the correction parameter, and generating corrected reference image data; and comparing the checking-image data with the corrected reference image data by using a pre-set value so as to determine the degree of matching between the checking-image data and the corrected reference image data, thereby performing image checking on the printed image.

A computer program product includes a non-transitory computer-readable medium having computer-readable program codes embodied in the medium for a computer to check a printed image printed out on a printing medium by an image forming device and read by an image reading device. The computer includes an attribute-information storage unit that stores therein attribute information about the printing medium and including a correction-parameter storage unit that stores therein a correction parameter corresponding to the attribute information. The program codes when executed causes the computer to execute acquiring checking-image data that is read by and output from the image reading device, original reference image data that is input to the image forming device, and, from the attribute-information storage unit, attribute information about a printing medium on which an image is printed; reading, from the correction-parameter storage unit, a correction parameter corresponding to the attribute information acquired at the acquiring, correcting the original reference image data by using the correction parameter, and generating corrected reference image data; and comparing the checking-image data with the corrected reference image data by using a pre-set value so as to determine the degree of matching between the checking-image data and the corrected reference image data, thereby performing image checking on the printed image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a flowchart that illustrates the flow of an image checking process performed by the image checking device.

DETAILED DESCRIPTION OF THE PREFERRED EMBODIMENTS

Exemplary embodiments of an image checking device, a printing system, an image checking method, and a computer program product according to the present invention are explained in detail below with reference to the accompanying drawings.

The color of printed material changes depending on the color of the paper. The degree of change is nearly zero for a solid area (i.e., a state in which the area is painted in one color) where the paper surface is fully covered with the coloring material, and the degree of change is maximum for a highlighted area (the most bright area) where the paper surface is hardly covered with the coloring material. The same tendency is also apparent in regard to the type, thickness, and glossiness of the paper. According to this embodiment, the checking criterion does not change depending on the type of paper. Instead, the effect of color, type, thickness, or glossiness of the paper is applied to the image data of a reference image, which is to be used for image checking, in a continuous manner from highlighted to solid areas so that the image data of the reference image can be corrected, whereby a device can be produced which can handle the above-described changes in density. Specifically, the reference image is corrected depending on the type of paper so that a reference image corresponding to the type of the paper is generated, whereby a constant checking accuracy is ensured for all the density ranges from highlights to shadows. A detailed explanation is given below.

Figure 1:
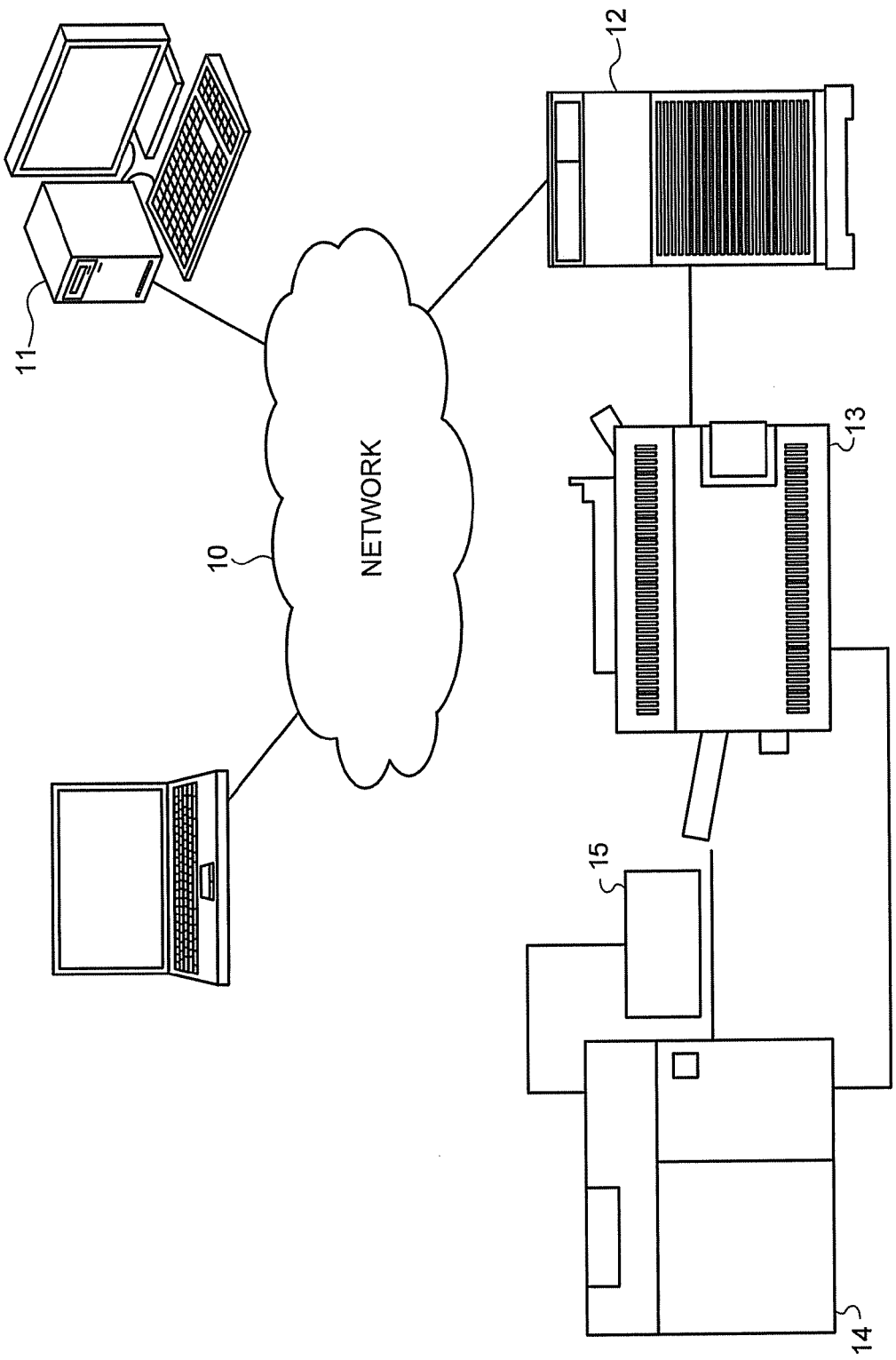
FIG. 1 is an explanatory diagram that illustrates an exemplary configuration of a printing system that includes an image checking device according to an embodiment.

FIG. 1 is an explanatory diagram that illustrates an exemplary configuration of a printing system that includes an image checking device according to the embodiment. The printing system principally includes a client personal computer (PC) 11 that is connected to a network 10; a digital front end (DFE) 12 that is connected to the network 10; a printer 13 that is a printing device connected to the DFE 12 via a cable, or the like; and an image checking device 14 that is connected to the printer 13.

The client PC 11 stores, as image data, a document created by a user or an image read by a scanning device and transmits the print data for printing a document or image to the printer 13 via the network 10. Therefore, the client PC 11 includes an operating system (OS) that controls the overall computer; firmware that performs basic control of the hardware; drivers for controlling the scanning device and the printer 13; a storage device that stores applications, and the like, for creating a document; a processor that reads and executes the programs from the storage device; a network interface that enables communication via the network 10; an input device, such as a keyboard for inputting data or a mouse enabling the selection of an icon, cursor movement, scrolling, or the like; and a display device that displays input characters and images.

The client PC 11 transmits the print data for printing a created document, or the like, to the DFE 12. A driver installed in the client PC 11 performs a conversion to generate a command, which is described in a printer language interpretable by the printer 13; configures the print data that includes printing setting information, such as the number of print copies, the paper sheet size, the presence or absence of printing in combination, the presence or absence of two-sided printing, or the like, which has been set by a user when issuing a print command; and transmits the print data to the DFE 12.

The DFE 12 receives the print data that has been transmitted from the client PC 11 via the network 10 and that includes the command described in the printer language. The DFE 12 analyzes the printer language of the command included in the print data and depicts an image. If the printer 13 is, for example, a page printer, the DFE 12 receives the print data that includes a command described in a page description language (PDL), analyzes the page description language, and generates bitmap image data that has a format such that the printer 13 can receive the data on a per-page basis. The DFE 12 transmits the bitmap image data, which has been generated for each page, to the printer 13 on a per-page basis. For example, if print data is received that includes a command described in a page description language, i.e., Post Script (registered trademark), the DFE 12 generates CMYK 8-bit raster image processor (RIP) image data of 600 dpi, and transmits the image data to the printer 13. The RIP is hardware that develops data, which is described in Post Script (registered trademark), into a printable bitmap image. The above-mentioned dpi is an abbreviation for dots per inch.

The DFE 12 further includes an application specific integrated circuit (ASIC), which is an integrated circuit for a specific application, so as to perform, for example, a digitalization process to convert a grayscale image into a black and white binary image during the drawing of an image or an edge detection process to detect the boundary between objects by using changes in the density.

The printer 13 forms an image by using the bitmap image data received from the DFE 12 and prints out the image. If the printer 13 is an offset printer as described above, the printer 13 includes a feed unit, a printing unit, a discharging unit, and the like. The feed unit includes a board on which multiple sheets of paper are placed; a delivery unit that delivers the sheets of paper one by one to the printing unit; and a sheet conveying board that includes a detecting unit so as to prevent two sheets of paper from being conveyed in an overlapped manner for printing. The discharging unit includes a board on which a printed sheet of paper, which is a printout, is placed; a conveying unit that conveys the printout to the board; and a sheet aligning unit that aligns a sheet of paper placed thereon.

The printing unit includes an ink bottle that contains each color of ink; a dampening unit that contains water; a plate cylinder that rotates with a plate, which is made by a plate-maker in accordance with bitmap image data, wound around the plate cylinder; a blanket that is in contact with the plate and onto which the ink attached to the plate is transferred; a blanket cylinder that rotates with the blanket wound around it; and an impression cylinder that is in contact with the blanket so that a sheet of paper is brought into contact with the blanket and the ink image on the blanket is transferred onto the paper and that applies pressure to the paper while conveying the paper. Here, an explanation is given where the printer 13 is an offset printer; however, the embodiment is not limited to this and the printer 13 may be an electrophotographic printer, or the like.

If the printer 13 is an electrophotographic printer, the printer may include an exposure device that emits light for writing an image; a photosensitive drum at which the writing light is emitted; a charging unit that charges the photosensitive drum; a developing unit that causes toner to adhere to a latent image, which is formed on the surface of the photosensitive drum due to the writing light, and develops the image; a transfer unit that transfers the toner image, which has been formed due to the developing process, onto a sheet of paper; a fixing unit that applies heat and pressure to the paper so that the transferred toner image is fixed to the paper; a feed unit that feeds the paper; and a discharging unit that discharges the paper to which the toner image has been fixed.

The image checking device 14 receives, as checking-image data, an input of the image data of the printout that is read from the printout, which has been printed by the printer 13, by an image reading device 15 and output from it. The image checking device 14 also receives an input of the bitmap image data, which has been received by the printer 13 from the DFE 12, as original reference image data. The image checking device 14 also receives the attribute information about a printing medium that is identified on the basis of the type of paper, which is received by the printer 13 as the printing setting information. The attribute information includes the paper's type, color, thickness, glossiness, surface condition, such as concavity and convexity of the surface, spectral reflectance characteristics, and the like.

The types of paper include high-quality paper that is used as general copy paper; coated paper that is gloss paper used for color printing; recycled paper that is recycled old paper; and art paper that has higher glossiness than coated paper and a smooth surface. Coated paper and art paper have characteristics such that they are thinner and have a brighter white than high-quality paper, and high-quality paper has characteristics such that it has a brighter white than recycled paper. The concavity and convexity of the surface of art paper, or the like, are less because the surface thereof is smooth. The glossiness indicates the degree of regular reflection of light, and the spectral reflectance characteristics represent the difference in the reflection intensity depending on wavelength. The spectral reflectance characteristics can be represented by using the spectral reflectivity that is a ratio that indicates how much light is reflected when light of 100 units of energy hits an object.

The image checking device 14 corrects the original reference image data by using correction parameters that are obtained in accordance with the attribute information received from the printer 13 so as to generate reference image data. This is because the accuracy of the reference image necessary for image checking changes depending on the attributes of the printing medium, such as the printing medium's type, color, thickness, glossiness, surface condition, and spectral reflectance characteristics; therefore, in order to ensure a constant checking accuracy, the reference image needs to be corrected by using these attributes. A detailed explanation is given later of the calculation of specific correction parameters.

The image checking device 14 compares the corrected reference image with the read checking image so as to perform image checking. The image checking is performed on the basis of whether the checking image has been reproduced with respect to the reference image with a constant accuracy. For example, it is determined whether the checking image has been reproduced on the basis of whether the color difference is greater than a threshold.

The image reading device 15 may use a known scanning device and include a light source, mirror, lens, and an imaging element, such as a charge coupled device (CCD) or complementary metal oxide semiconductor (CMOS). The read resolution capability of the image reading device 15 has to obviously be greater than or equal to the resolution of the image to be checked.

Figure 2:
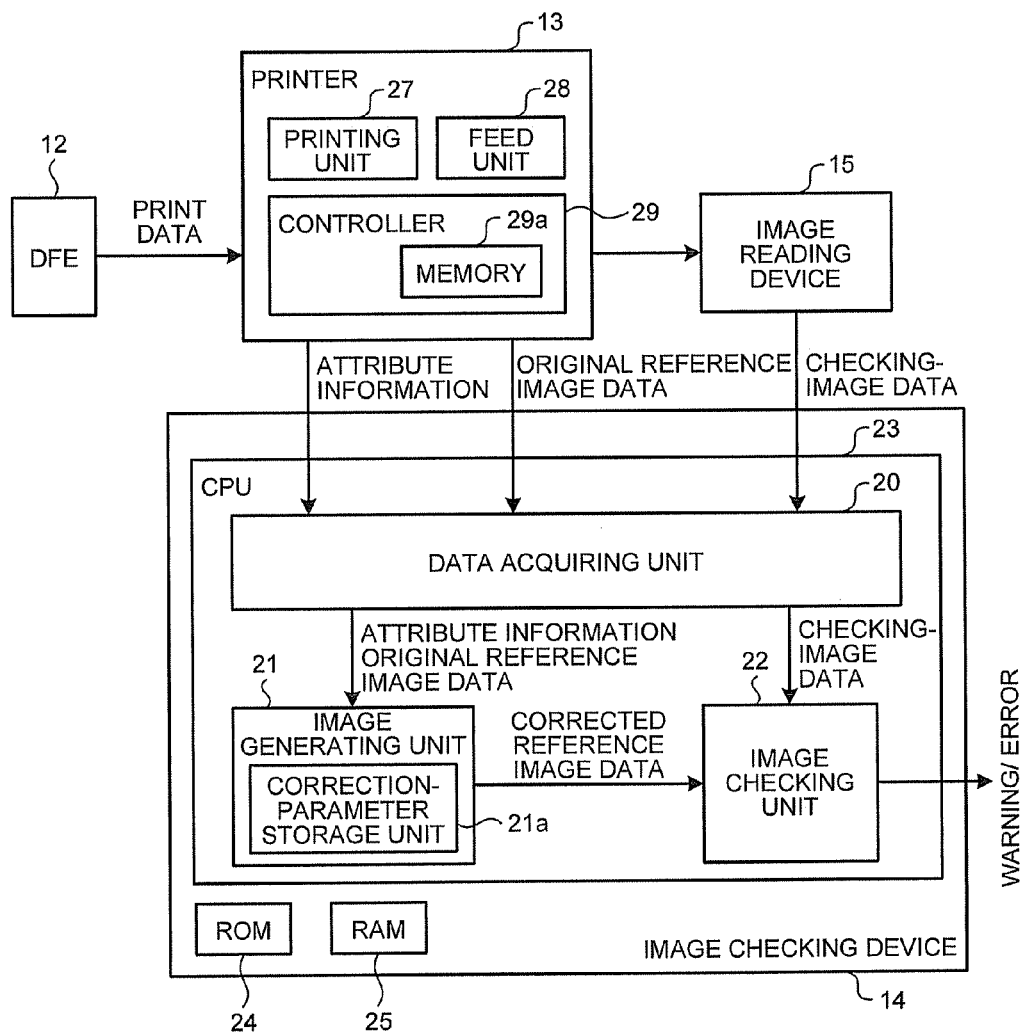
FIG. 2 is a block diagram that illustrates the functional configuration of the printing system.

FIG. 2 is a block diagram that illustrates the functional configuration of the printing system. The printer 13 includes a printing unit 27 that includes an image forming unit that performs an image forming process; a feed unit 28 that feeds and conveys a sheet of paper, which is a printing medium; a controller 29 that controls the overall printer 13; and a memory 29a that stores therein the attribute information about a printing medium. The image checking device 14 includes a CPU 23 that includes a data acquiring unit 20, an image generating unit 21, and an image checking unit 22; a ROM 24; and a RAM 25. These perform the functions described below. The image generating unit 21 includes a correction-parameter storage unit 21a that stores therein correction parameters that correspond to the attribute information about a printing medium. The correction-parameter storage unit 21a corresponds to, for example, a LUT that stores gamma conversion tables, which are illustrated in FIG. 4 and will be described later.

When receiving bitmap image data from the DFE 12, the printer 13 uses the data to print out an image to a printing medium. The printout is sent to the image reading device 15 so that the printed information is read as an image. The read image is regarded as a checking image, and its data is transmitted to the image checking device 14. At the same time, the printer 13 transmits the bitmap image data and the attribute information about the printing medium to the image checking device 14. The printing medium is not limited to paper but may be any media on which an image can be printed, such as a plastic sheet, plastic card, metallic sheet, or rubber sheet. An explanation is given below using paper as the printing medium.

The memory 29a of the printer 13 pre-stores therein the attribute information about a sheet of paper, such as the color, thickness, glossiness, surface condition, and spectral reflectivity, corresponding to the type of the paper. Corresponding attribute information can be read and acquired in accordance with the setting information, such as the type of paper, included in the print data received from the client PC 11. Because this is only an example, it is also possible that, when the client PC 11 transmits the setting information that includes the type of paper to the printer 13, the client PC 11 can include information, such as a sheet's color, thickness, glossiness, surface condition, and spectral reflectivity, which are pre-stored corresponding to the type of paper, in the setting information to be transmitted.

In order to perform the above-described functions, the image checking device 14 principally includes the data acquiring unit 20 that acquires, from the printer 13 that is a printing device, bitmap image data as the original reference image data, acquires, via the memory 29a, the attribute information about a sheet of paper on which an image is to be printed, and acquires, as checking-image data, image data on the printout that is read by the image reading device 15, which reads the printout output from the printer 13; includes the image generating unit 21 that corrects the original reference image data by using the correction parameters corresponding to the acquired attribute information so as to generate corrected reference image data; and includes the image checking unit 22 that compares the checking-image data with the corrected reference image so as to check the image of the printout.

An explanation is given here by using the above-described example. The image generating unit 21 uses CMYK 8-bit RIP image data, which is the original reference image data acquired by the data acquiring unit 20, and the information about a paper's type, color, thickness, glossiness, surface condition, and spectral reflectance characteristics; calculates correction parameters on the basis of the information; and corrects the RIP image data by using the correction parameters to generate corrected reference image data on the reference image, which is to be compared with the checking-image data.

The image checking unit 22 compares the checking image, which is generated by using the checking-image data acquired by the data acquiring unit 20, for example, an RGB 8-bit image or a Lab 24-bit image, with the reference image generated by using the reference image data. Here, the Lab color space (hereafter, simply referred to as Lab) is one of the generally known uniform color spaces. The axis L represents the brightness and is indicated using a value from 0 to 100. The axis a represents the colors from green to magenta, and the axis b represents the colors from blue to yellow, both being indicated using a value from −120 to +120. If the value L is 0, it represents black. If the value L is 100, it represents white. If the values a and b are 0, the color saturation is zero and represents gray. As the absolute values of the values a and b increase, it indicates that the color saturation is higher.

For example, if the checking-image data output from the image reading device 15 and the original reference image data received from the printer 13 are both output by using the Lab, the color difference can be easily calculated by using a predetermined arithmetic expression. The color difference quantitatively represents the perceptual difference in color. The color difference can be calculated by finding the square root of the sum of the squares of the difference between the values L, the values a, and the values b of the two images. If the color difference is calculated, it is then determined whether the color difference is greater than a threshold, which is a predetermined value, whereby the checking can be performed. If the color difference is greater than the threshold, the check result indicative of a mismatch can be output. The check result indicative of a mismatch means that the printout does not conform to the desired quality, i.e., does not meet the quality standard. In such a case, a warning or error can be output. The color difference is calculated on the basis of the geometric distance within the Lab color space and is used as a value for evaluating the difference in the brightness or color of an image.

In a conventional image checking device, at a time when the corrected reference image data (Lab) is obtained from the original reference image data (CMYK), data conversion is always performed by assuming that an ideal paper is in a specific state. If the requirement for image checking accuracy is low, the above data conversion can sufficiently respond to the requirement regardless of the type, color, thickness, and the like of the paper to be used. However, in the case where an image with a color difference of about 3 is checked, it is necessary to generate reference image data with high accuracy.

Here, the color difference of 3 is a value that is often used as a threshold at which humans can identify the difference in color. Even if the color difference is about 2, humans can recognize the difference in skin color, gray, or the like, because humans are sensitive to changes in such colors. Therefore, at a time when the corrected reference image data (Lab) is obtained from the original reference image data (CMYK), it is necessary to obtain correct reference image data in consideration of the attribute information of the paper. The evaluation criteria using the color difference with the value of 2 or 3 are approved by the National Bureau of Standards (NBS unit), and, according to these evaluation criteria, the color differences 1.5 to 3, which include the color difference 2 and 3, are regarded as a considerable degree of color difference.

Figure 3:
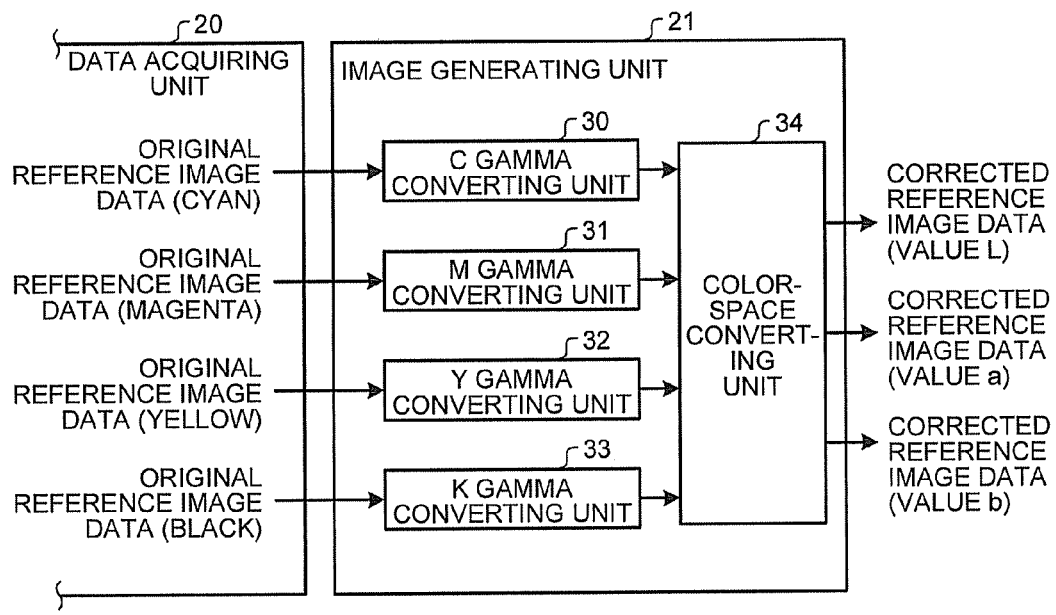
FIG. 3 is a functional block diagram that illustrates an exemplary configuration of an image generating unit.

FIG. 3 is a functional block diagram that illustrates an exemplary configuration of the image generating unit 21. The image generating unit 21 includes, for data in each CMYK color of the original reference image data, a C gamma converting unit 30 that performs gamma conversion on color C (cyan); an M gamma converting unit 31 that performs gamma conversion on color M (magenta); a Y gamma converting unit 32 that performs gamma conversion on color Y (yellow); a K gamma converting unit 33 that performs gamma conversion on color K (black); and a color-space converting unit 34 that converts input data on each color, on which the gamma conversion has been performed, into a three-dimensional color space, such as RGB or Lab. In CMYK 8-bit RIP image data that is received from the printer 13, each of the four colors, i.e., cyan (C), magenta (M), yellow (Y), and black (K), has 8-bit data, and data for each color is input to the C gamma converting unit 30, the M gamma converting unit 31, the Y gamma converting unit 32, and the K gamma converting unit 33, respectively.

The C gamma converting unit 30, the M gamma converting unit 31, the Y gamma converting unit 32, and the K gamma converting unit 33 perform gamma conversion by using a look up table (LUT) with 8-bit input and 8-bit output. The gamma conversion characteristics, which are correction parameters, are changed on the basis of the paper attribute information received from the printer 13, and the gamma conversion is performed by using the gamma values obtained from the changed gamma conversion characteristics, whereby data for each color is corrected. Specifically, after the output value with respect to the input value in the LUT is changed in accordance with the gamma conversion characteristics, which have been changed on the basis of the paper attribute information, the output value is obtained by using the changed LUT with respect to the input value of data for each color of the original reference image data, whereby it is possible to output data on which the gamma conversion has been performed and which has been corrected in accordance with the paper attribute information.

The color-space converting unit 34 converts the four-dimensional CMYK color space into a three-dimensional color space, such as RGB or Lab, and generates corrected reference image data on each CMYK color, which is to be compared with the checking-image data. The color-space converting unit 34 converts data for each color, on which the gamma conversion has been performed, into color-space data that can be compared with the checking-image data. Specifically, the grid points of the CMYK space are converted into grid points of an RGB or Lab space, and data between the grid points is obtained by performing an interpolation calculation. A known tetrahedral interpolation method is used as the above method, and the color-space converting unit 34 can perform the tetrahedral interpolation method.

The color-space converting unit 34 also performs a conversion by using an LUT in the same manner as the C gamma converting unit 30, the M gamma converting unit 31, the Y gamma converting unit 32, and the K gamma converting unit 33. A setting is made such that the output is equal to the input with respect to the gamma conversion characteristics of the C gamma converting unit 30, the M gamma converting unit 31, the Y gamma converting unit 32, and the K gamma converting unit 33, and while a sheet of paper is assumed to have a specific type, color, thickness, glossiness, surface condition, and spectral reflectance characteristics, the data output from the C gamma converting unit 30, the M gamma converting unit 31, the Y gamma converting unit 32, and the K gamma converting unit 33 is determined as an input value so that an output value obtained for the input value can be determined as a color-space conversion parameter. However, because it takes a long time to determine such parameters, it is difficult for a user to perform the conversion in a flexible manner depending on the paper; therefore, the color-space conversion parameters are pre-set for typical types of paper.

FIGS. 4A to 4D illustrate the gamma conversion characteristics set for some type of paper. FIGS. 4A to 4D are graphs that illustrate the relation between the input value and the output value for cyan (C), magenta (M), yellow (Y), and black (K), respectively. In FIGS. 4A to 4D, the horizontal axis indicates the input value (0 to 255) for each CMYK color, and the vertical axis indicates the output value (0 to 255). A value closer to 0 indicates a lower density, and a value closer to 255 indicates a higher density. For example, if data has the CMYK input values=(0, 0, 0, 0), it indicates a state where nothing is printed on a sheet of paper. The C gamma converting unit 30, the M gamma converting unit 31, the Y gamma converting unit 32, and the K gamma converting unit 33 refer to the gamma conversion characteristics illustrated in FIGS. 4A to 4D, respectively, so as to perform a gamma conversion process on each CMYK color and then outputs processed data to the color-space converting unit 34.

If the sheet of paper to be checked has a higher density than the assumed density of the sheet of paper, there is a large effect on highlighted areas. Therefore, in order to reproduce this, the gamma conversion characteristics are such that input data is slightly raised on the side of highlighted areas (on the side close to the origin). Thus, it is possible to produce a state where the area with a color closer to the white of paper is affected by the color of the paper.

Figure 4A:
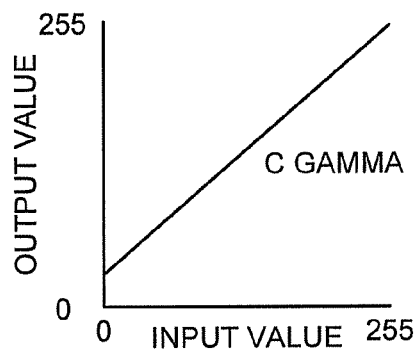
FIGS. 4A to 4D illustrate graphs that represent the conversion characteristics corresponding to a gamma conversion table.
Figure 4B:
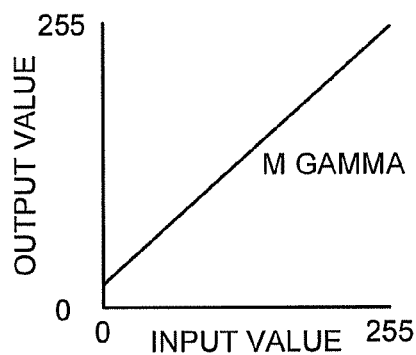
Figure 4C:
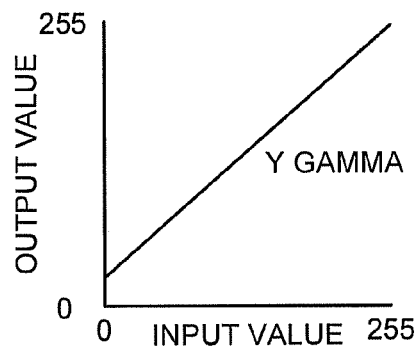

In the case of the standard paper type A that is used when the color-space conversion parameters are set, the intercepts of all the graphs that indicate the gamma conversion characteristics are 0 and the slope is 1. However, in the case of the paper type B, whose color is a little closer to yellow than the standard paper, the intercept of the graph that indicates the yellow gamma conversion characteristic illustrated in FIG. 4C is, for example, 15, and the intercept of the graph that indicates the magenta gamma conversion characteristic illustrated in FIG. 4B is about 10. In the case of the paper type C, whose color is a little closer to blue than the standard paper, the intercept of the graph that indicates the cyan gamma conversion characteristic illustrated in FIG. 4A is, for example, 15, and the intercept of the graph that indicates the magenta gamma conversion characteristic illustrated in FIG. 4B is about 5.

Figures 5, 6:
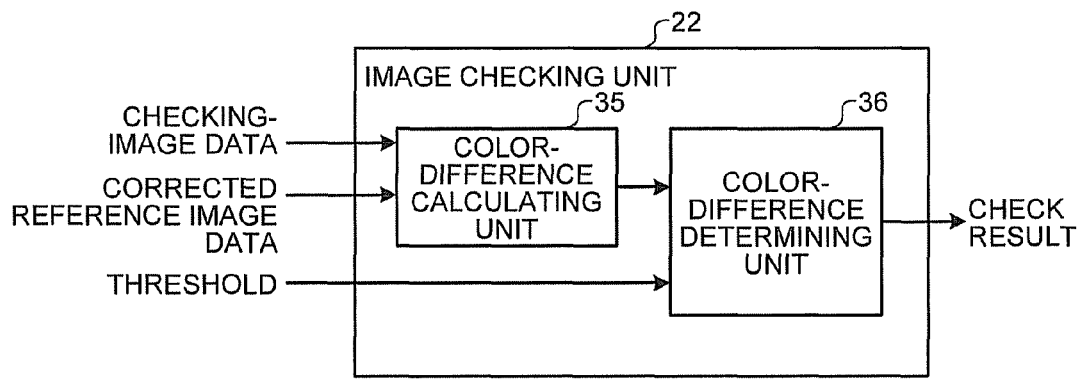
FIG. 5 is a table that illustrates the values of the intercepts of the graphs that illustrate the conversion characteristics for the colors depending on the type of paper.
FIG. 6 is a block diagram that illustrates a first example of the functional configuration of an image checking unit.

FIG. 5 is a table that contains the values of the intercepts of the graphs that illustrate the gamma conversion characteristics for the colors that have been changed depending on the type of paper. With the configuration of the image generating unit 21 illustrated in FIG. 3, the values Lab for the blank surface of the paper can be obtained by using this table. In FIG. 5, in order to obtain the values Lab of the blank surface of the paper, it is preferable that, with respect to the paper type A, the intercept of the graph that illustrates the cyan gamma conversion characteristic is set to 9, the intercept of the graph that illustrates the magenta gamma conversion characteristic is set to 10, and the intercept of the graph that illustrates the yellow gamma conversion characteristic is set to 7. Furthermore, it is preferable that, with respect to the paper type B, the intercept of the graph that illustrates the cyan gamma conversion characteristic is set to 10, the intercept of the graph that illustrates the magenta gamma conversion characteristic is set to 11, and the intercept of the graph that illustrates the yellow gamma conversion characteristic is set to 14. Moreover, it is preferable that, with respect to the paper type C, the intercept of the graph that illustrates the cyan gamma conversion characteristic is set to 15, the intercept of the graph that illustrates the magenta gamma conversion characteristic is set to 14, and the intercept of the graph that illustrates the yellow gamma conversion characteristic is set to 0.

Although it is preferable that the effect of the blank surface of the paper is obtained from each value illustrated in the table of FIG. 5, it is necessary to print patches at a predetermined density on each sheet of paper so as to check whether the straight lines illustrated in FIGS. 4A to 4D can be obtained for areas other than the area where the input value is zero in the graph indicating the gamma conversion characteristics, i.e., other than the blank surface characteristics. Thus, the intercept is changed depending on the type of paper, the gamma conversion characteristics are changed so as to change the LUT, and the gamma conversion is performed on the original reference image data by using the changed LUT, whereby the original reference image data can be corrected.

FIG. 6 is a block diagram that illustrates a first example of the functional configuration of the image checking unit 22. The image checking unit 22 includes a color-difference calculating unit 35 and a color-difference determining unit 36. Although the checking-image data output from the image reading device 15 is not illustrated in FIG. 6, the checking-image data is converted from RGB data into Lab color-space data by the image reading device 15. Therefore, the color-difference calculating unit 35 uses the converted data and the corrected reference image data to calculate the color difference between the images. The color difference is calculated by the above-described method, i.e., by calculating the Euclidean distance for both sets of data. The color-difference determining unit 36 then compares the calculated color difference with a threshold so as to determine whether the check result is acceptable.

For example, it is determined whether the checking-image data matches the corrected reference image on the basis of whether the color difference is greater than or equal to 3 for colors, such as red, blue, or green, and on the basis of whether the color difference is greater than or equal to 2 for skin color, gray, or the like, to which changes in color humans are sensitive, whereby it is determined whether an image of the printout is acceptable. If it is determined that the image is acceptable, the image is determined to be an imagable printout. If it is determined that the image is not acceptable, a warning, error, or the like, is displayed so that the printout can be discarded, or the like.

An explanation is given above of the image checking device that takes into account the effect of the color of the paper on the reference image data. Thus, image checking can be performed correctly even if a printout to be checked has an unexpected paper color. However, the reference image data is not affected by only the color of the paper. It is also affected by the thickness of the paper. This is because thin paper is strongly affected by the condition of the background on the reverse side of the paper, whereas thick paper is not affected by this. Specifically, the amount of effect of the background on the color of the blank surface changes depending on the thickness of paper. If the color of the background in the image reading device 15 is completely the same as the color of the paper, the above-described problem does not occur in the image checking device 14; however, because the color of the paper to be delivered is not known, it is reasonable to assume that the color of the paper is always different from the color of the background.

In the above-described example, the parameters to be used for the conversion by the C gamma converting unit 30, the M gamma converting unit 31, the Y gamma converting unit 32, the K gamma converting unit 33, and the color-space converting unit 34 are set for an assumed type of paper. It is assumed that the paper has sufficient thickness and there is no effect due to the background. However, the actual paper to be used has a different thickness and, in the case of thin paper, the paper is affected by the background; therefore, it is necessary to perform correction for the effect of a background plate in accordance with the thickness of paper.

Figure 4D:
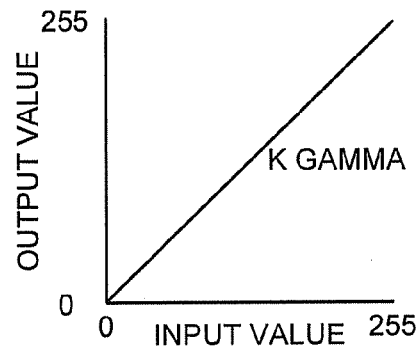

For example, regardless of whether the density of paper is higher or lower than the background plate, if the background plate can be seen through, the paper seems to have a slightly higher density, compared to a case where there is only paper. In such a case, the highlighted side of the graph that illustrates the black gamma conversion characteristic, which is illustrated in FIG. 4D, is slightly corrected by setting the intercept to a value greater than zero so that the color of the reference image becomes a little darker. This intercept of the graph can be obtained in the experiment by using the parameters that are changed in accordance with the transmittance or thickness of the paper.

Thus, in addition to cyan, magenta, and yellow illustrated in FIGS. 4A to 4C, correction is performed on the intercept for black illustrated in FIG. 4D, and the gamma conversion is performed by using the LUT, to which the above correction has been made, whereby it is possible to generate reference image data on the basis of considerations of the color and thickness of the paper.

The effect of paper includes not only the color and thickness but also the paper's glossiness, surface condition, spectral reflectance characteristics, and the like. As for the glossiness, an actual sheet of gloss paper is read and testing is performed, whereby the gamma conversion characteristics and the color-space conversion parameters can be calculated.

The glossiness of paper mainly affects the white area and paper with high glossiness has an increasing number of direct reflection components. Paper with high glossiness has a relatively small number of scattered-light components when the density or brightness is measured. As a result, the observed density is high. As illustrated in FIGS. 4A to 4D, as the input value is increased, there is an indication that the output value, i.e., the density on the paper surface, is increased; therefore, if there is an indication that the sheet of paper has high glossiness, the Y-intercepts of the CMY graphs illustrated in FIGS. 4A to 4C are changed to the positive side so as to be corrected.

A high-speed printer, which aims to replace printing, is required to handle various types of paper. Paper has a different color, thickness, glossiness, and surface asperity depending on the type. In the case of paper with large surface asperity, there is a lot of variation in the data that is read during image checking, and such variation is large in highlighted areas. Therefore, a threshold is changed by using the value L, which indicates the brightness of the reference image data, so that correction can be performed in accordance with the surface condition.

Figure 7:
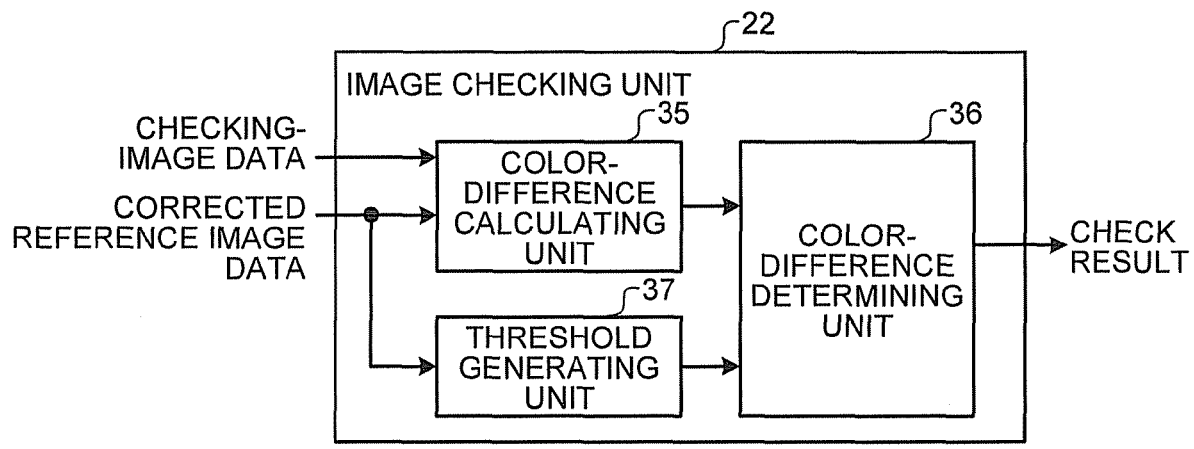
FIG. 7 is a block diagram that illustrates a second example of the functional configuration of the image checking unit.

As illustrated in a second example of the functional configuration in FIG. 7, the image checking unit 22 includes the color-difference calculating unit 35 that receives image read data (Lab) and reference image data (Lab) and then calculates the color difference by using these sets of data; a threshold generating unit 37 that receives the reference image data and changes the threshold by using the value L of the reference image data so as to generate a threshold corresponding to the paper; and the color-difference determining unit 36 that uses the calculated color difference and the generated threshold to determine whether the color difference is greater than the threshold and, if the color difference is greater than the threshold, outputs a check result indicating a mismatch.

Figure 8:
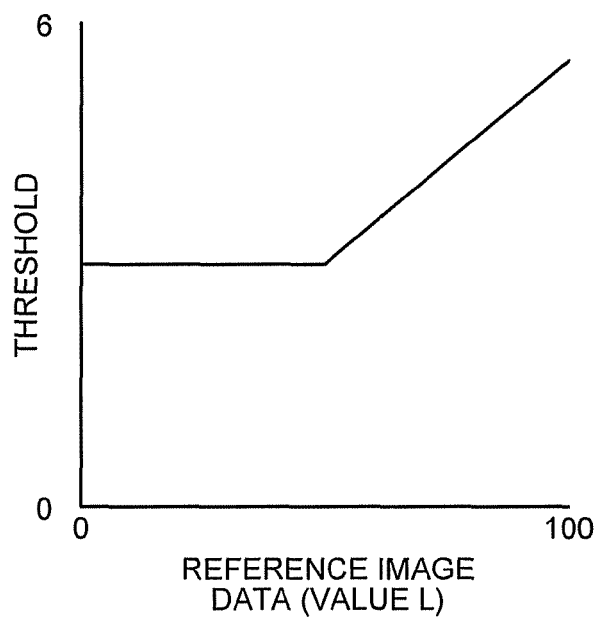
FIG. 8 is a graph that represents the conversion characteristics corresponding to a threshold conversion table.

FIG. 8 is a graph that illustrates the conversion characteristics corresponding to a threshold conversion table to be used by the threshold generating unit 37. The value L becomes large as the brightness is increased, and a larger checking threshold is set if the color is closer to the white of paper for which the value L is large. A constant checking threshold is set for the area where the surface of the paper is covered with the coloring material and the effect of the paper's concavity and convexity is small. In FIG. 8, the horizontal axis indicates the value L of the reference image data, and the vertical axis indicates the checking threshold. The checking threshold is constant until the value L reaches a certain value, and the checking threshold is increased at a constant rate after the value L reaches the certain value. A threshold conversion table is created on the basis of these conversion characteristics, and the threshold generating unit 37 uses the threshold conversion table to generate a threshold in accordance with the value L of the reference image data.

Here, only an example is illustrated where the checking threshold is changed in accordance with only the value L; however, because the value L is different corresponding to the amount of attached toner depending on the color CMY, it is preferable that the checking threshold is set on the basis of three elements, i.e., the value L, the value a, and the value b of Lab.

Figure 9:
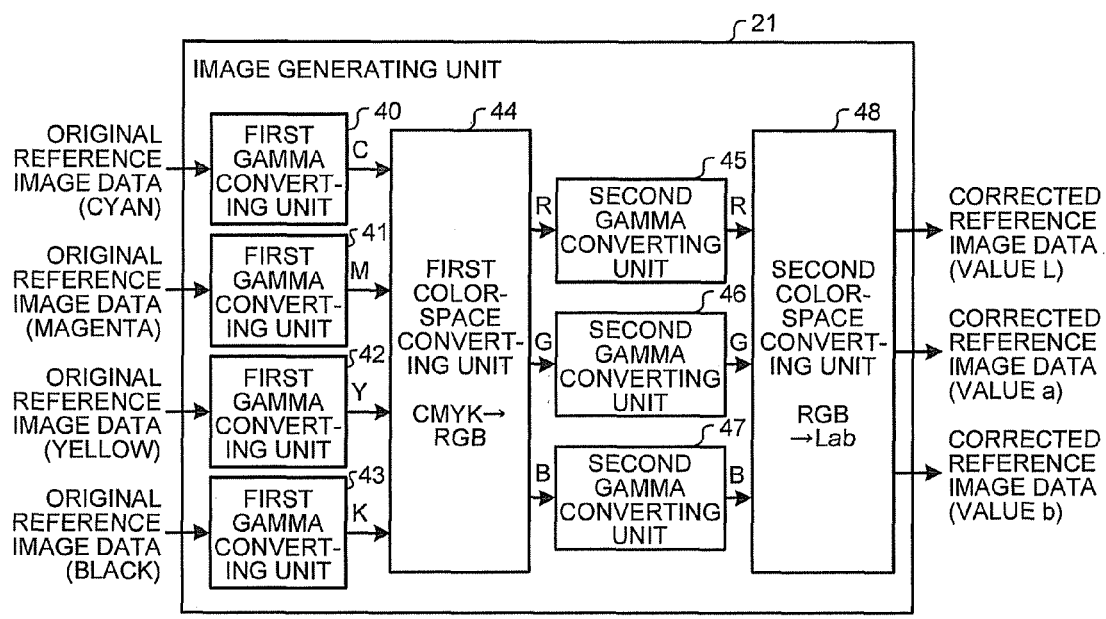
FIG. 9 is a block diagram that illustrates another example of the functional configuration of the image generating unit.
Figure 10A:
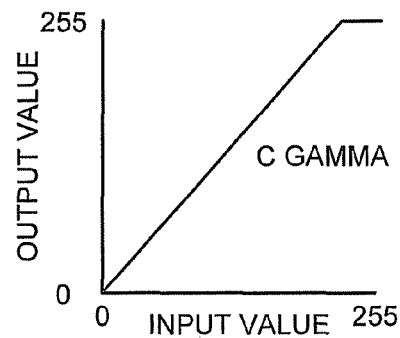
FIGS. 10A to 10D illustrate graphs that represent the conversion characteristics corresponding to a gamma conversion table.
Figure 10B:
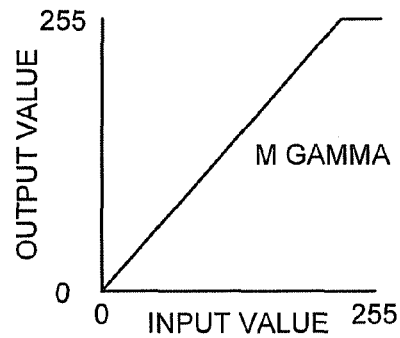
Figure 10C:
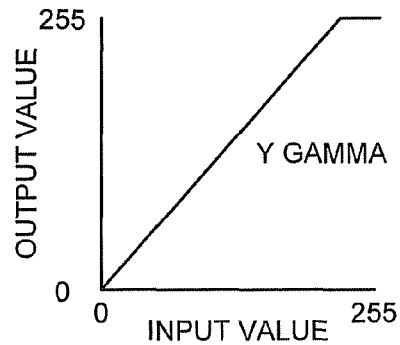
Figure 10D:
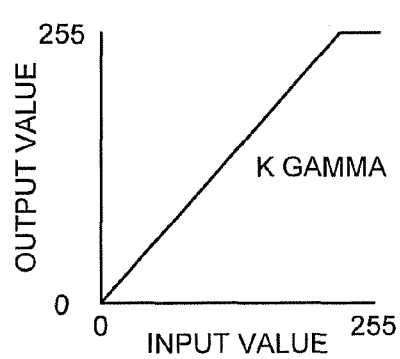

FIG. 9 is a block diagram that illustrates another example of the functional configuration of the image generating unit. In this example, the image generating unit 21 includes four first gamma converting units 40 to 43; a first color-space converting unit 44 that receives four sets of converted data (CMYK) from the first gamma converting units 40 to 43, performs the color space conversion from CMYK to RGB, and outputs three sets of data (RGB); second gamma converting units 45 to 47 that receives the three sets of data (RGB) output from the first color-space converting unit 44 and performs the gamma conversion; and a second color-space converting unit 48 that receives the three sets of data (RGB) output from the second gamma converting units 45 to 47, performs the color space conversion, and outputs three sets of data (Lab).

The flow of the operation until bitmap image data is generated from the original reference image data (CMYK) is the same as that of the configuration illustrated in FIG. 3. In this example, the gamma conversion is further performed on three sets of data, which are obtained by the first gamma converting units 40 to 43 and the first color-space converting unit 44, and the color space conversion is performed on the output three sets of data so as to convert the data into Lab color space data.

Depending on its type, some paper has a large number of reflectance components of infrared light, and some paper is excited by ultraviolet components of a light source so as to produce light and look whiter. For paper that has a large number of reflectance components of infrared light, the gamma correction is performed such that the R components (red components) are increased on highlighted areas, whereby approximation is achieved. Furthermore, for paper that is excited by ultraviolet components so as to look whiter, the gamma correction is performed such that data in all the channels of RGB components is increased on highlighted area, whereby approximation is achieved.

For such data that needs two corrections, the image generating unit 21 includes two pairs of converting units that each include the gamma converting unit and the color-space converting unit; thus, two corrections can be performed. Thus, the image generating unit 21 can include multiple pairs of converting units for data that needs multiple corrections.

In the above-described example, the gamma conversion is further performed after CMYK data is converted to RGB data by the first gamma converting units 40 to 43 and the first color-space converting unit 44; therefore, the reference image data can be correctly generated for the image that is output to the paper with peculiar spectral characteristics, whereby image checking can be performed on such a type of paper with a constant accuracy.

If images are formed by using coloring material that has high glossiness, higher density is obtained compared to a case where images are formed by using coloring material with normal glossiness. Especially, the density becomes higher for a solid area where a sufficient amount of toner is attached. In order to correct this, a device that has the same configuration as that illustrated in FIG. 3 is used, and the shadow side is raised in the gamma conversion characteristics to be applied, as illustrated in the graphs of FIGS. 10A to 10D. That is, the output values on the side of larger input values are increased in the graph.

Due to the above operation, if the fixing characteristics are changed and the glossiness is controlled so as to be increased, the density can be correctly checked.

With reference to FIG. 11, a detailed explanation is given of an image checking method performed by the image checking device 14. FIG. 11 is a flowchart that illustrates the flow of a process performed by the image checking device 14. When this process starts, the data acquiring unit 20 first acquires the original reference image data and the attribute information about a sheet of paper (printing medium) from the printer 13 (Step S101). Then, the image generating unit 21 obtains, from the table illustrated in FIG. 5, the values of the intercepts of the graphs that illustrate the gamma conversion characteristics, which are correction parameters, in accordance with the acquired paper attribute information, changes the gamma conversion characteristics, and changes the LUT on the basis of the changed gamma conversion characteristics (Step S102).

The image generating unit 21 then uses the changed LUT to perform a gamma conversion on the original reference image data, performs a color space conversion for correction, and generates corrected reference image data, which is under the same conditions as those for the paper used for the printout and is to be used as a comparison criterion (Step S103).

The data acquiring unit 20 then acquires, from the image reading device 15 that has read the printout, checking-image data that is read image data (Step S104). Furthermore, the image checking unit 22 receives the checking-image data from the data acquiring unit 20, receives the corrected reference image data from the image generating unit 21, and compares both sets of image data so as to perform the image checking (Step S105).

Then, it is determined whether the checking-image data matches the corrected reference image data during the above-described image checking (Step S106). If it is determined that the two sets of image data match (No at Step S106), the checking is terminated. Conversely, if it is determined that the two sets of image data do not match at Step S106 (Yes at Step S106), a warning or error indicating that the two sets of image data do not match is output as the check result (Step S107), and the checking process is terminated.

At the above-described Step S103, the C gamma converting unit 30, the M gamma converting unit 31, the Y gamma converting unit 32, and the K gamma converting unit 33 included in the image generating unit 21 perform the gamma conversion on data for each color of the original reference image data acquired by the data acquiring unit 20 by using the gamma conversion table, which is changed in accordance with the paper attribute information, and the color-space converting unit 34 converts data for each color, on which the gamma conversion has been performed, into color space data that can be compared with the checking-image data.

At Step S106, the image checking unit 22 determines whether the color difference between the checking-image data and the reference image data exceeds a threshold and, if it exceeds the threshold, the process proceeds to Step S107. Then, a warning or error indicating that the image of the printout does not match the reference image is output as the check result.

Specifically, at Step S105, the color-difference calculating unit 35 included in the image checking unit 22 uses the checking-image data and the corrected reference image data to calculate the color difference between the checking-image data and the corrected reference image data, and, at Step S106, the color-difference determining unit 36 determines whether the color difference calculated at Step S105 exceeds a pre-set threshold.

When the threshold is calculated from the corrected reference image data, at Step S105, the threshold generating unit 37 considers the concavity and convexity of the paper and uses the threshold conversion table to calculate a threshold on the basis of the corrected reference image data.

A program to be executed according to the present embodiment is provided by being pre-installed on the ROM 24; however, the present invention is not limited to this. A program to be executed according to the present embodiment may be provided as a computer program product by being stored, in the form of a file that is installable and executable, in a recording medium readable by a computer, such as a CD-ROM, a flexible disk (FD), a CD-R, or a digital versatile disk (DVD).

Furthermore, a configuration may be such that the program to be executed according to the present embodiment is stored in a computer connected via a network such as the Internet and provided by being downloaded via the network. Moreover, a configuration may be such that the program to be executed according to the present embodiment is provided or distributed via a network such as the Internet.

The program to be executed according to the present embodiment has a modular configuration that includes the above-described data acquiring unit 20, the image generating unit 21, and the image checking unit 22. In terms of actual hardware, the CPU 23 (processor) reads the program from the above-described recording medium and executes the read program so as to load the above-described units into a main storage device, such as a memory, so that the data acquiring unit 20, the image generating unit 21, and the image checking unit 22 are generated in the main storage device.

As described above, the gamma conversion characteristics are changed in accordance with the paper attribute information, such as the type, color, thickness, glossiness, surface condition, and spectral reflectance characteristics, and the threshold conversion characteristics are also changed. The original reference image data is corrected by using the conversion table corresponding to the above characteristics so as to generate corrected reference image data, whereby an image of the printout read by the image reading device 15 can be compared with the reference image, which is under substantially the same conditions as those for the paper of the printout, such as the type, color, thickness, glossiness, surface condition, and spectral reflectance characteristics, and therefore a constant checking accuracy can be ensured.

The image generating unit 21 includes the C gamma converting unit 30, the M gamma converting unit 31, the Y gamma converting unit 32, and the K gamma converting unit 33 that perform the gamma conversion on data for each color of the original reference image data, which is acquired by the data acquiring unit 20, by using the gamma conversion table, which is changed in accordance with the attribute information; and includes the color-space converting unit 34 that converts data for each color, on which the gamma conversion has been performed, into color space data that can be compared with the checking-image data. The C gamma converting unit 30, the M gamma converting unit 31, the Y gamma converting unit 32, and the K gamma converting unit 33 correct the original reference image data so as to generate corrected reference image data, and the color-space converting unit 34 converts data into color space data that has the same color space as the checking image and that can be compared with the checking image. For example, if the original reference image data is CMYK color space data and the checking-image data is Lab color space data, the color-space converting unit 34 can convert the original reference image data into Lab color space data, which is the same as the checking-image data.

In accordance with the type of printing medium, the image generating unit 21 can include more than one gamma converting unit and more than one color-space converting unit, which converts the data, on which the gamma conversion has been performed, into color space data. Depending on its type, some paper has a large number of reflectance components of infrared light, and some paper is excited by ultraviolet components of a light source so as to produce light and look whiter. Therefore, the first gamma converting unit performs the gamma correction such that the red components are increased, and the second gamma converting unit performs the gamma conversion such that all of the red, blue, and green components are increased.

The image checking unit 22 determines whether the color difference between the checking-image data and the reference image data exceeds a threshold and, if it exceeds the threshold, outputs the check result indicating that the image of the printout does no match the reference image. In this case, the image checking device 14 can display a warning or error on a display screen of an information processing device, which issues a print command, or on a printing device.

To perform this, the image checking unit 22 can include the color-difference calculating unit 35 that calculates the color difference between the checking image and the reference image by using the checking-image data and the corrected reference image data; and can include the color-difference determining unit 36 that determines whether the calculated color difference exceeds a pre-set threshold.

The image checking unit 22 can further include the threshold generating unit 37 that takes the asperity of the paper into account and uses the threshold conversion table to calculate a threshold on the basis of the corrected reference image data.

According to embodiments, the original reference image is corrected in accordance with the type of paper and a corrected reference image is generated corresponding to the type of the paper so that the images can be checked; thus, a constant checking accuracy can be ensured for all the density ranges from highlights to shadows.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image checking device that checks a printed image printed out on a printing medium by an image forming device and read by an image reading device, the image forming device including an attribute-information storage unit that stores therein attribute information about the printing medium, the image checking device comprising:
  a data acquiring unit that acquires checking-image data that is read by and output from the image reading device, original reference image data that is input to the image forming device, and, from the attribute-information storage unit, attribute information about a printing medium on which an image is printed;
  a correction-parameter storage unit that stores therein a correction parameter corresponding to the attribute information;
  an image generating unit that reads, from the correction-parameter storage unit, a correction parameter corresponding to the attribute information acquired by the data acquiring unit, corrects the original reference image data by using the correction parameter, and generates corrected reference image data; and
  an image checking unit that compares the checking-image data with the corrected reference image data by using a pre-set value so as to determine the degree of matching between the checking-image data and the corrected reference image data, thereby performing image checking on the printed image.

2. The image checking device according to claim 1, wherein
  the printing medium is paper, and
  the attribute information about the printing medium includes information about a paper's type, color, thickness, glossiness, surface condition, and spectral reflectance characteristics.

3. The image checking device according to claim 1, wherein
  the image generating unit includes:
    a gamma converting unit that performs gamma conversion on data for each color of the original reference image data acquired by the data acquiring unit, the gamma conversion being performed by using a gamma conversion table that is changed in accordance with the attribute information; and
    a color-space converting unit that converts the data for each color that has been subjected to the gamma conversion by the gamma converting unit into color space data that can be compared with the checking-image data.

4. The image checking device according to claim 3, wherein
  the gamma converting unit performs more than one gamma conversion depending on the type of the printing medium, and
  the color-space converting unit performs color space conversion so as to convert data that has been subjected to more than one gamma conversion by the gamma converting unit into color space data.

5. The image checking device according to claim 1, wherein the image checking unit determines whether color difference between the checking-image data and the corrected reference image data exceeds a pre-set threshold and, if the color difference exceeds the threshold, outputs a check result indicating that the printed image does not match the reference image.

6. The image checking device according to claim 5, wherein
  the image checking unit includes:
    a color-difference calculating unit that uses the checking-image data and the corrected reference image data to calculate the color difference between the checking-image data and the corrected reference image data; and
    a color-difference determining unit that determines whether the color difference calculated by the color-difference calculating unit exceeds a pre-set threshold.

7. The image checking device according to claim 5, wherein
  the image checking unit includes:
    a color-difference calculating unit that uses the checking-image data and the corrected reference image data to calculate the color difference between the checking-image data and the corrected reference image data;
    a threshold calculating unit that has a threshold conversion table and uses the threshold conversion table to calculate the threshold on the basis of the corrected reference image data; and
    a color-difference determining unit that determines whether the color difference calculated by the color-difference calculating unit exceeds the threshold calculated by the threshold calculating unit.

8. A printing system comprising:
  the image checking device according to claim 1;
  the image forming device that receives an input of the original reference image data, outputs the printed image, and transmits the original reference image data and the attribute information about the printing medium to the image checking device; and
  the image reading device that reads the printed image output from the image forming device and outputs the checking-image data.

9. An image checking method for checking a printed image printed out on a printing medium by an image forming device and read by an image reading device, the image forming device including an attribute-information storage unit that stores therein attribute information about the printing medium and including a correction-parameter storage unit that stores therein a correction parameter corresponding to the attribute information, the image checking method comprising:
  acquiring checking-image data that is read by and output from the image reading device, original reference image data that is input to the image forming device, and, from the attribute-information storage unit, attribute information about a printing medium on which an image is printed;
  reading, from the correction-parameter storage unit, a correction parameter corresponding to the attribute information acquired at the acquiring, correcting the original reference image data by using the correction parameter, and generating corrected reference image data; and
  comparing the checking-image data with the corrected reference image data by using a pre-set value so as to determine the degree of matching between the checking-image data and the corrected reference image data, thereby performing image checking on the printed image.

10. A computer program product comprising a non-transitory computer-readable medium having computer-readable program codes embodied in the medium for a computer to check a printed image printed out on a printing medium by an image forming device and read by an image reading device, the computer including an attribute-information storage unit that stores therein attribute information about the printing medium and including a correction-parameter storage unit that stores therein a correction parameter corresponding to the attribute information, the program codes when executed causing the computer to execute:

acquiring checking-image data that is read by and output from the image reading device, original reference image data that is input to the image forming device, and, from the attribute-information storage unit, attribute information about a printing medium on which an image is printed;

reading, from the correction-parameter storage unit, a correction parameter corresponding to the attribute information acquired at the acquiring, correcting the original reference image data by using the correction parameter, and generating corrected reference image data; and comparing the checking-image data with the corrected reference image data by using a pre-set value so as to determine the degree of matching between the checking-image data and the corrected reference image data, thereby performing image checking on the printed image.

* * * * *